United States Patent [19]
Drewry et al.

[11] Patent Number: 5,925,100
[45] Date of Patent: Jul. 20, 1999

[54] CLIENT/SERVER SYSTEM WITH METHODS FOR PREFETCHING AND MANAGING SEMANTIC OBJECTS BASED ON OBJECT-BASED PREFETCH PRIMITIVE PRESENT IN CLIENT'S EXECUTING APPLICATION

[75] Inventors: Raymond G. Drewry, Menlo Park; David George, Mountain View; Dirk Epperson, Berkeley, all of Calif.

[73] Assignee: Sybase, Inc., Emeryville, Calif.

[21] Appl. No.: 08/620,066

[22] Filed: Mar. 21, 1996

[51] Int. Cl.⁶ ........................... G06F 13/00
[52] U.S. Cl. .................. 709/219; 709/203; 711/213; 711/118
[58] Field of Search ............... 382/305; 707/102; 711/118, 213; 709/219, 203

[56] References Cited

U.S. PATENT DOCUMENTS

| | | | |
|---|---|---|---|
| 5,305,389 | 4/1994 | Palmer | 382/305 |
| 5,396,614 | 3/1995 | Khalidi et al. | 711/118 |
| 5,721,865 | 2/1998 | Shintani et al. | 395/383 |
| 5,765,159 | 6/1998 | Srinivasan | 707/102 |

*Primary Examiner*—Le Hien Luu
*Attorney, Agent, or Firm*—John A. Smart

[57] ABSTRACT

A client/server system is described incorporating methods for managing object availability through semantic object "load sets." By associating a particular "load set" with each object which might be requested by a client, improved object fetching and cache management is provided. Methods are described for managing object fetching and discarding on a per object basis, not on a per page basis. Each "semantic object" is packaged in a "storable," which incorporates dependency lists indicating the context in which the object is to be used (i.e., with which dependent objects). Additionally, a program developer can specify that the set of behaviors is defined at runtime, using "prefetch" primitives provided by the system. This allows an executing application to prefetch objects based on the then-existing dynamics of the system. With this approach, object availability in a distributed object environment (e.g., Internet) is improved.

28 Claims, 12 Drawing Sheets

700

(a)

| | REQUIRED DEP. | OBJECT | PREFETCH DEP. |
|---|---|---|---|
| SERVER | X | X | X |
| CLIENT | | | |

(b)

| | REQUIRED DEP. | OBJECT | PREFETCH DEP. |
|---|---|---|---|
| SERVER | X | X | |
| CLIENT | | | X |

(c)

| | REQUIRED DEP. | OBJECT | PREFETCH DEP. |
|---|---|---|---|
| SERVER | X | | X |
| CLIENT | | X | |

(d)

| | REQUIRED DEP. | OBJECT | PREFETCH DEP. |
|---|---|---|---|
| SERVER | X | | |
| CLIENT | | X | X |

.
.
.

(n)

| | REQUIRED DEP. | OBJECT | PREFETCH DEP. |
|---|---|---|---|
| SERVER | | | |
| CLIENT | X | X | X |

|  | REQUIRED DEP. | OBJECT | PREFETCH DEP. |
|---|---|---|---|
| GET OBJECT | X | X | X |
| GET "NAME" |  |  |  |

(b)

|  | REQUIRED DEP. | OBJECT | PREFETCH DEP. |
|---|---|---|---|
| GET OBJECT | X | X |  |
| GET "NAME" |  |  | X |

(c)

|  | REQUIRED DEP. | OBJECT | PREFETCH DEP. |
|---|---|---|---|
| GET OBJECT | X |  | X |
| GET "NAME" |  | X |  |

(d)

|  | REQUIRED DEP. | OBJECT | PREFETCH DEP. |
|---|---|---|---|
| GET OBJECT | X |  |  |
| GET "NAME" |  | X | X |

．
．
．

(n)

|  | REQUIRED DEP. | OBJECT | PREFETCH DEP. |
|---|---|---|---|
| GET OBJECT |  |  |  |
| GET "NAME" | X | X | X |

*FIG. 8*

CLIENT/SERVER SYSTEM WITH METHODS FOR PREFETCHING AND MANAGING SEMANTIC OBJECTS BASED ON OBJECT-BASED PREFETCH PRIMITIVE PRESENT IN CLIENT'S EXECUTING APPLICATION

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to systems and methods for processing requests for access to data in environments having one or more clients connected to a host (or set of hosts). is Today's computer environment is dominated by "client/server" computer systems. Such a system typically comprises one or more "client" computers connected to a host or "server" computer through a network. An increasingly important application of client/server systems is for providing an Interactive Television (ITV) environment.

ITV environments are typified by set top boxes, at individual customer sites (e.g., consumer home), connected via a broadband network to a central office. Such an environment is illustrated in FIG. 1 as Interactive Television (ITV) environment 100. The environment 100 includes a multitude of set top boxes (STBs) 110, such as set top box 101, connected via a high-bandwidth communication medium 120 (e.g., coax, fiber optic, and the like) to a central office 130. Each set top box itself is generally a small, economically-produced consumer unit which sets atop a television. Communication between the set top box and the central office is bidirectional. In general operation, the set top box 101 interacts with a television, such as television 103.

Through the set top box 101, the central office 130 can send streams of objects to customers, all upon specific requests by the customers. The term "objects," as used herein, encompasses not only classical "objects" with computational capability (e.g., C++objects) but also non-computational objects, including data objects comprising video, pictures, audio, text, and other information. At the central office, one or more server computers (e.g., server 131) are employed for servicing the requests of each particular set top box. In particular, the servers "serve" information to the set top boxes, including information about the kind of services and features (e.g., videos) that the customer or user can receive on his or her TV. Services which the user might receive include, for instance, a travel service, a weather service, a home shopping service, a video rental service, and the like.

The set top box itself is a microcomputer in its own right and, thus, includes common microcomputer components, such as a microprocessor (e.g., Intel 486) and memory (e.g., random-access memory or "RAM"). Since set top boxes are generally geared to the mass consumer market, they must be produced economically. Accordingly, memory in such boxes is typically constrained, relative to what one would find in a desktop computer. Since these clients have a small amount of memory, a problem exist as to how one optimizes the use of local memory: specifically, what objects are brought into local memory and what objects are tossed out of local memory (e.g., during low memory conditions).

In the ITV environment, the time for a server to initially process a request for data is expensive. In other words, the operation of "telling" the server that an object is required is in itself an expensive operation. The "sending" operation, in contrast, is relatively cheap. For systems connected to the Internet, on the other hand, networks tend to have low latency and low bandwidth. In both cases, a problem remains as to how one improves object accessibility and management in the face of slow and/or delayed object transmission.

Classic memory "paging" systems found in standard computer architecture are not well-equiped to address this problem. In ITV systems, typically an ATM (Asynchronous Transfer Mechanism) is employed from the server to the client, thus yielding high bandwidth. The slow or delayed transmission time can be attributed, in part, to the architecture of phone switching networks. In communication from the client to the server, typically a single channel is employed, which must be arbitrated among multiple clients. Since only a fraction of its bandwidth is available to a particular client, it operates much slower.

For instance, to load an application from an Internet server might require that a relatively large portion of the application be transmitted to the local client which then must load particular bits of the transmitted application into its core memory for execution. The latency for performing this task is typically on the order of several seconds, or even minutes. When clients with small memory (e.g., the above-mentioned set top boxes) are connected to such networks, the problem is expectedly compounded. The result is a high penalty for I/O (input/output) operations. Coupled with this problem is the fact that typically very little "room" (i.e., memory) exists on the client side for storing objects once they have been received.

Classically, the management of memory resources or "memory management" has been provided at the physical or hardware level. Employing a "paging scheme," prior art systems process memory in terms of "pages," for instance, loading up or swapping out a particular fixed-size physical unit (e.g., 2K page). The approach is ill-suited for the ITV environment, however. Consider an Interactive TV application program. Here, the program developer is more concerned with actual "objects," not physical pages. For example, the developer is concerned about which images are now required to be in memory, which multimedia objects need to be in memory, or which class definitions need to be in memory. To such a developer, physical units, such as 2K memory pages, are not helpful for managing his or her program. Quite simply, the ITV developer cannot practically organize his or her application in terms of physical units, such as memory pages or disk sectors.

Another difficulty with present day paging systems is that of thrashing. Thrashing occurs when the system must repeatedly access the storage device. This results because the act of loading particular pages may lead to the paging out of other pages which, in turn, are required by the pages which are being brought in. Eventually, a working set will quiesce. In a highly dynamic environment, such as in Interactive TV, it is far more difficult ahead of time to predict appropriate working sets for user tasks, as the user has a multitude of execution paths available (e.g., skipping from one page to another in an interactive application). In such an environment, the working set is so dynamic that it will generally not "settle down."

One attempt to solving the foregoing problem to bring together needed functionality is a "Dynamic Link Library" (DLL), such as found in Microsoft Windows and IBM OS/2. Here, particular functionality can be deployed in a single DLL, which is then loaded dynamically at runtime upon request from a client. However, the granularity for DLLs is at the level of the library, not at the level of the object. In other words, when a request is made for particular functionality in a DLL, the system will attempt to load the entire DLL (and its dependents). Once loaded, the DLL will participate in paging in a manner similar to that done for program code in other prior art systems.

"Packaging" is a slight improvement to the approach of Dynamic Link Libraries. In prior art Lisp systems, for example, the developer could specify that a program required a certain "package"—a logical bundling of functionality. To the extent that the developer or programmer can specify dependencies of various packages, the approach is an improvement over Dynamic Link Libraries. Once particular packages are brought in, however, their participation in paging is essentially no different than other regions of physical memory. The packages would be paged in or swapped out according to a standard paging scheme, such as least-recently used (LRU) "aging."

Whether Dynamic Link Libraries or "packages," prior art systems assume a locality of reference (i.e., a grouping together of related items). Multimedia material—images, real time video, and audio—typically violate the locality of reference assumptions and usage patterns employed by traditional paging systems. What is needed, therefore, are systems with methods which provide objects to clients on a per-object basis, not a per-page basis. Further, such a system should respond to user requirements on-the-fly—at runtime—for providing a set of objects in client memory which is meaningful for the user task at hand. The present invention fulfills this and other needs.

SUMMARY OF THE INVENTION

The present invention may be implemented in those environments which provide a "host," such as a "server," connected to at least one "client." Generally, such a "client/server" environment is characterized by a multitude of clients connected via a broadband communication network to one or more servers. The server(s), operating under a server operating system (e.g., UNIX), includes a database server subsystem. In general operation, clients store data in and retrieve data from one or more database tables resident on the server by submitting SQL commands, some of which specify "queries"—criteria for selecting particular records of a table.

The present invention is preferably embodied in a Multimedia Client/Server System comprising one or more Clients connected to a Server module, via a Broadband Communication Network. The Server module comprises a plurality of servers, including a Dispatch Server linked into an Open Server/Open Client API (Application Programming Interface), an Intermedia Server (Sybase SQL Server), and a Video Processor/Media Stream Server. Data for the Intermedia Server is stored in Table(s). The Video Processor, which may comprise an available third party media server, provides information content (e.g., multimedia) under control of the Dispatch Server. The Video Processor serves as a means for storing video content which is provided to Clients (set top boxes) under control of the Dispatch Server.

The Interactive Television (ITV) Client/Server System is augmented with an "authoring system" for creating applications which reside on the server and run at the client. During typical use of the system, a developer employs the authoring system for creating a source code description or script of the program under development. The script, in turn, is "compiled" by the compiler. Here, the compiler parses the information generated by the authoring system, for creating a compiled version of the program under development. The application is then deployed, together with a runtime module, as a runtime application at a target server. At runtime, a client loads the application from the server, whereupon it is executed at the client.

The present invention includes methods which allow a developer to predefine a set of behaviors based on semantic "objects"—the items which are really of interest. Each object is packaged in a "storable," which incorporates dependency lists indicating the context in which the object is to be used (i.e., with which dependent objects). Moreover, the developer can specify that the set of behaviors is defined at runtime, using "prefetch" primitives provided by the system. This allows an executing application to prefetch objects based on the then-existing dynamics of the system. The system can, for example, prefetch objects based on an end user's particular runtime interaction with the system. Even when no prefetch behavior is defined by the developer, the system includes default methods for optimizing the prefetching of objects. Using the list of dependencies, for instance, a server component in the system can prepare to send and/or actually send additional objects to a client when servicing a request for a particular object.

Each storable itself comprises an object (or set of objects, such as combined code and data objects) stored together with dependency information—that is, information indicating which particular objects are also required for use of the (main) object. Each object itself may comprise one or more data entities, code entities, or a combination thereof; there is no requirement that an object include or reference executable code (unlike, say, in object-oriented systems). Each program can be thought of as comprising a set of storables. An object may require that other objects be present in order for it to run. Since each such object is stored as a storable, dependencies can exist between storables. Apart from other storables which a particular storable is dependent on, there can exist storables which the particular object or storable "might" need. Whether this second class of storables is actually required at runtime execution is largely driven by end user action—how the end user interacts with the program.

An exemplary method for executing applications with prefetching of semantic objects is as follows. First, the system receives a request from a client to launch an application. In the Internet environment, for example, the user can click on a hyperlink for launching an interactive application. The application object arrives at the client. Its initial task is to bring up the first page or scene of the application. From the dependency list for the first page, the system can determine required objects for displaying the first page. From this, the system requests these objects from the server. Once these objects are available at the client, the first page can be rendered or displayed. The prefetch objects for the first page can now be retrieved. This can be done either by the system by default, or it can be done in response to commands of the application itself. For the system-default prefetching, the system determines objects to prefetch based on the previously-coded relationships between pages. For application or user-directed prefetching, the system performs prefetching based on programmatic requests present in the scripts, which operate in response to user behavior at runtime. Thus, for system-default prefetching, the objects prefetched are based on the "navigational exits" from the page (e.g., "page #1" exists to "page #2"). For a complex page with many exits, however, better results are generally achieved by directing prefetching based on user input at the page. Next, the application enters a steady state. If memory resources run low as a result of operation, the system can discard objects, particularly those which are unused prefetch objects (e.g., in accordance with a multi-level caching scheme). The system continues in this steady state until a request is received to go to a next page (or the application terminates).

Upon receipt of a request to go to a next page, the system undertakes steps similar to that previously described for the first page. Note, however, that objects exist in the client's local cache. Therefore, the client will first check its cache before fetching required objects or prefetching other objects. In a preferred embodiment, a multi-level caching scheme is maintained at the client. A first level cache stores objects in random-access memory (RAM) of the client. In addition to this, the client can cache objects in its local storage device (e.g., hard disk). Although caching from the local storage device is far slower than caching to random-access memory, it is substantially faster than retrieving the object across a network. When prefetch items are tossed out of memory, for instance, they can be swapped to local disk. In a preferred embodiment, prefetched objects are not "unpacked" until they are actually required for use. Here, these objects are not unpacked into an executable form in memory. Instead, they are simply maintained locally until such time as they might be required.

BRIEF DESCRIPTION OF THE DRAWINGS

FIG. 7 is a diagram illustrating the various combinations of dividing between client and server the responsibility for managing fetching for an object, its required dependents, its prefetch dependents, or any combination thereof.

FIG. 8 is a diagram illustrating the various combinations of fetching an object, its required dependents, and its prefetch dependents, or any object names thereof.

DETAILED DESCRIPTION OF A PREFERRED EMBODIMENT

Figure 1:
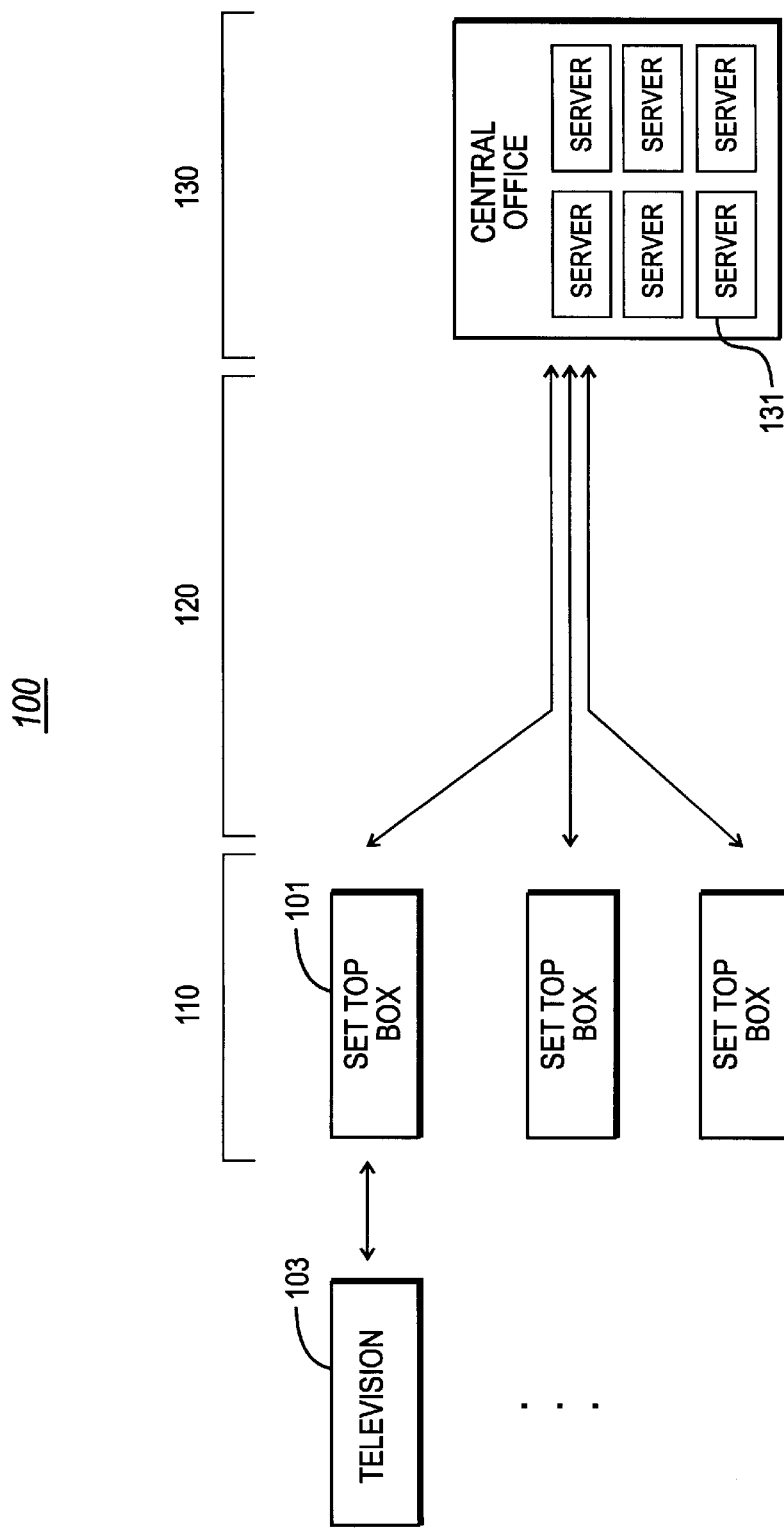
FIG. 1 illustrates a ITV environment having set top boxes, at individual customer sites (e.g., consumer home), connected via a broadband network to a central office.

The following description will focus on the presently preferred embodiment of the present invention, which is operative in a client/server system, such as employed for Interactive Television. The present invention is not limited to any particular application or environment, however. Instead, those skilled in the art will find that the present invention may be advantageously applied to any application or environment requiring efficient transmittal and management of objects sent from a host to a client. The description of the exemplary embodiments which follows is, therefore, for the purpose of illustration and not limitation.

Prefetching of Semantic Objects

A. General

In certain systems, such as set top boxes (for television systems), there exists very little local memory. In such clients with a small amount of memory and network transmission time limitations, systems have to be intelligent about what is kept in local memory (i.e., cached) and what is tossed out. A similar problem exists for systems connected to the Internet, but for different reasons. On the Internet and for Interactive TV (ITV), the networks employed are relatively slow and, thus, incur a high latency (including slow or delayed transmission time) when servicing requests for objects. To load an application from such a system, for instance, it might be required that a relatively large portion of the application be transmitted to the local client which then must load particular bits of the transmitted application into core memory for execution. The latency for performing this task is typically on the order of several seconds, or even minutes. When clients with small memory (e.g., set top boxes) are connected to such networks (e.g., the Internet), the problem is expectedly compounded. Here, there is a high penalty for I/O (input/output) operations; still further, there is very little room on the client side for caching objects which have been transmitted.

"Prefetching" is a technique which can address this problem. In general, prefetching is the notion of fetching additional items when a request is made for a particular item, such as for an object present on a storage device of a remote computer. Prefetching is a fairly well known feature of virtual memory management systems, such as those previously-described in the Background section. One common scheme is an LRU (least-recently used) scheme, where objects which are least-recently used are "aged out." In those prior art systems, however, the developer or programmer is typically given little or no control over prefetching. Such systems, in typical operation, will page in (i.e., load) or page out objects, based on physical considerations, such as when were particular memory pages last used, whether the requesting application is idle, and the like. Furthermore, such systems tend to make the very same decisions, of whether to page in a particular object, based on a fairly static set of rules.

In the system of the present invention, in contrast, the developer can predefine a set of behaviors based on semantic "objects"—the items which are really of interest. Each object is packaged in a "storable," which incorporates dependency lists indicating the context in which the object is to be used (i.e., with which dependent objects). Moreover, the developer can specify that the set of behaviors is defined at runtime, using "prefetch" primitives provided by the system. This allows an executing application to prefetch objects based on the then-existing dynamics of the system. The system can, for example, prefetch objects based on an end user's particular runtime interaction with the system. Even when no prefetch behavior is defined by the developer, the system includes default methods for optimizing the prefetching of objects. Using the list of dependencies, for instance, a server component in the system can prepare to send and/or actually send additional objects to a client when servicing a request for a particular object.

Independent of the above-described problem of network speeds, prefetching based on semantic objects has ramifications for the type of application which can now be built. A server can process a request for an object in the context of the particular client making the request. Contents of an application is dynamically varied by changing the objects which are related to an object being requested. Programming logic for deciding which related objects to return with a requested object can be embodied in stored procedures resident at the server. For example, a first client can issue a request for "thing." For that client, "thing" might mean particular program content, such as a bitmap image. In a similar manner, a second client might request "thing." In a manner transparent to each client, the server can process the request for "thing" in the context of each client. For the first client, "thing" might mean a bitmap image at a particular resolution. For the second client, however, "thing" might mean the same bitmap image, but at a lower resolution. Here, the server can change what each client gets as "thing," based on the server's knowledge of each client. This approach can be applied to change the actual application or content. Alternatively, it can be employed to change the quality (i.e., resolution) of the object which is delivered to the client.

B. System environment

1. General system

The present invention may be implemented in those environments which provide a "host," such as a "server," connected to at least one "client." Generally, such a "client/server" environment is characterized by a multitude of clients connected via a communication network to one or more servers. The server(s), operating under a server operating system (e.g., UNIX), includes a database server subsystem. In general operation, clients store data in and retrieve data from one or more database tables resident on the server by submitting SQL commands, some of which specify "queries"—criteria for selecting particular records of a table. Commercial examples of these "client/server" systems include Powersoft™ clients connected to one or more Sybase SQL Server™ database servers. Both Powersoft™ and Sybase SQL Server™ are available from Sybase, Inc. of Emeryville, Calif.

Client/server environments, database servers, and networks are well documented in the technical, trade, and patent literature. For a discussion of database servers and client/server environments generally, and SQL Server™ particularly, see, e.g., Nath, A., *The Guide to SQL Server*, Second Edition, Addison-Wesley Publishing Company, 1995. Additional documentation of SQL Server™ is available from Sybase, Inc. as *SQL Server Documentation Set* (Catalog No. 49600). For a discussion of a computer network employing Microsoft Networks/OpenNet File Sharing Protocol, see METHOD AND SYSTEM FOR OPPORTUNISTIC LOCKING IN A NETWORKED COMPUTER SYSTEM, Intl. Application No. PCT/US90/04570, Intl. Publication No. WO 91/03024, Intl. Publication Date Mar. 7, 1991. For a general introduction to use of a network, such as a Local Area Network (LAN) operating under NetWare, see Freed, L. et al., *PC Magazine Guide to Using NetWare*, Ziff-Davis Press, 1991. A more detailed discussion of Netware networks is available in NetWare 3.x and 4.x and accompanying documentation, which is available from Novell of Provo, UT. The disclosures of each of the foregoing are hereby incorporated by reference.

2. ITV Client/Server System

Figure 2A:
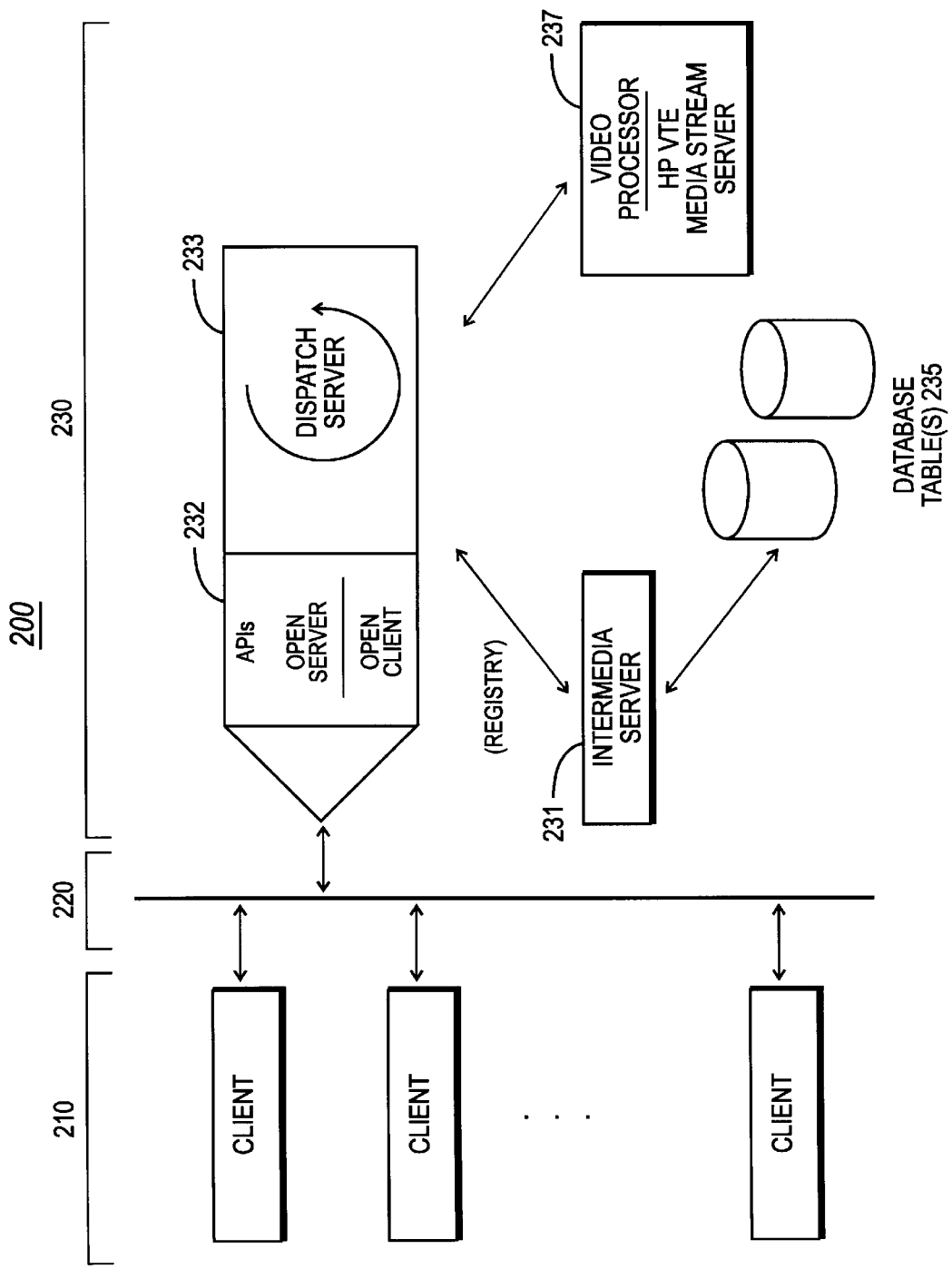
FIGS. 2A–B are block diagrams illustrating Interactive Television (ITV) Client/Server systems in which the present invention may be embodied.
Figure 2B:
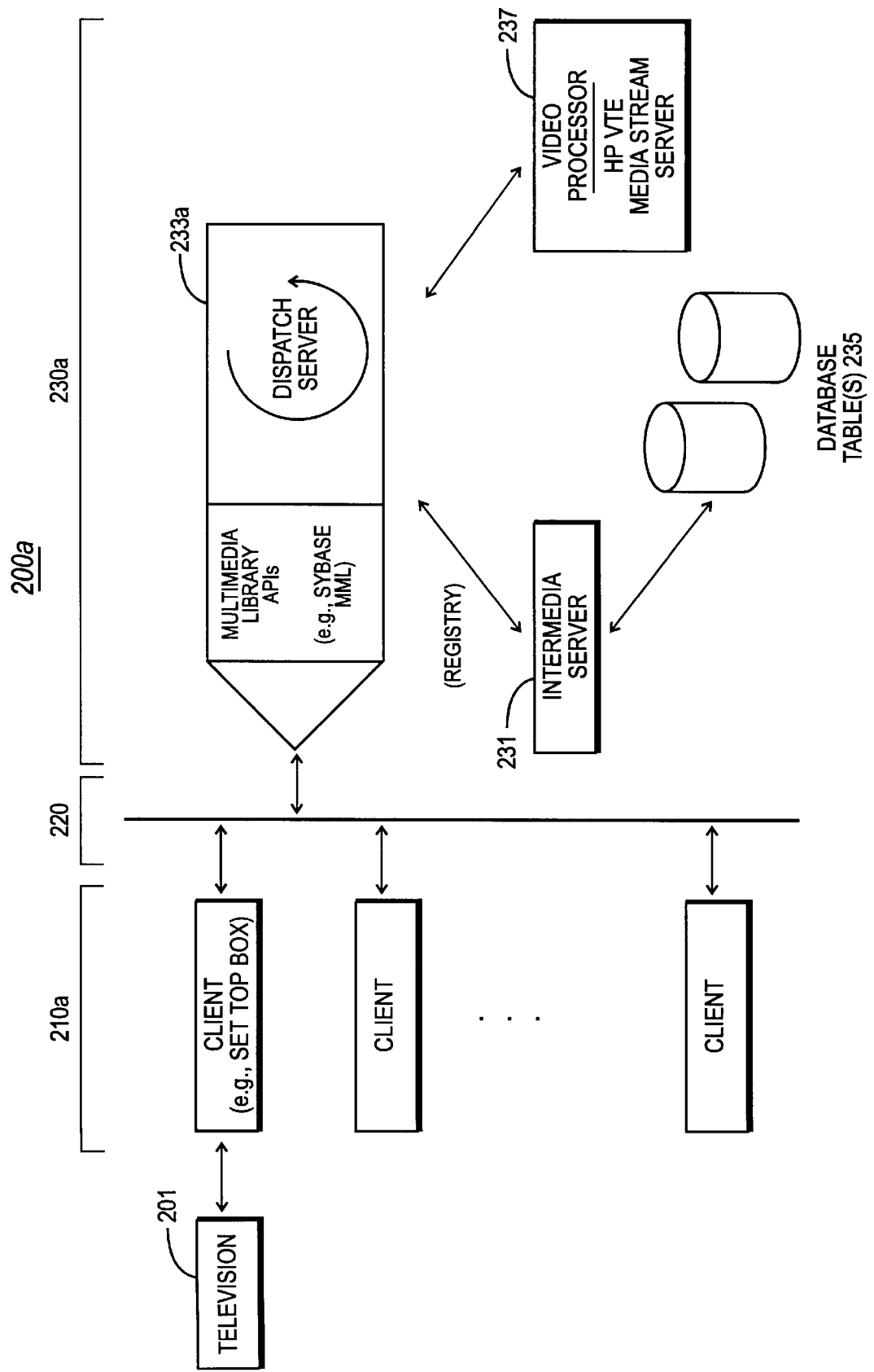

FIGS. 2A–B are block diagrams illustrating Interactive Television (ITV) Client/Server systems in which the present invention is preferably embodied. FIG. 2A illustrates Multimedia Client/Server System 200 which comprises one or more Clients 210 connected to a Server module 230, via a Broadband Communication Network 220. Server module 230 comprises a plurality of servers, including a Dispatch Server 233 linked into an Open Server/Open Client API (Application Programming Interface) 232, an Intermedia Server (Sybase SQL Server) 231, and a Video Processor/Media Stream Server 237. Data for the Intermedia Server is stored in Table(s) 235. The Video Processor 237, which may comprise an available third party media server, provides information content (e.g., multimedia) under control of the Dispatch Server 233. In a preferred embodiment, Video Processor 237 is a Hewlett-Packard VTE Media Stream Server, available from Hewlett-Packard of Palo Alto, Calif. The Video Processor 237 serves as a means for storing video content which is provided to Clients (set top boxes) under the control of the Dispatch Server 233.

Each of the Clients 210 operates under control of one or more applications developed in conjunction with the Application Programming Interface (API) 232 for communicating with the Servers. In the embodiment of FIG. 2A, the Interface 232 for communicating with the Servers comprises Sybase® Open Server™/Open Client™ interface (available from Sybase, Inc. of Emeryville, Calif.). The Interface provides entry points (e.g., named functions) which Clients can call into for requesting services from the Servers. On the Server side, a core services library is provided for servicing Client requests. The library includes functionality for receiving queries and returning rows back, for instance. The Open Server/Open Client interface is in communication with the Dispatch Server, so that calls for database (and related) functionality are routed from the interface to the Dispatch Server, for appropriate dispatching within the Server Module.

FIG. 2B illustrates an Interactive Television (ITV) Client/Server System 200a, which is employed in a preferred embodiment. Here, Clients 210a comprises one or more set top boxes (STBs) connected to Server module 230a, via the Broadband Communication Network 220. Server module 230a is essentially identical to Server module 230 except that the Interface has been changed to one which supports multimedia, as shown by Dispatch Server 233a. In a preferred embodiment, the Interface employed is Sybase MML (Multimedia Library), available from Sybase, Inc. of Emeryville, Calif. Each of the STB Clients 210a is typically connected to a television, such as TV 201. As before, the Video Processor 237 serves as a means for storing video content which is provided to Clients (set top boxes) under control of the Dispatch Server 233a.

3. Authoring System

Figure 2C:
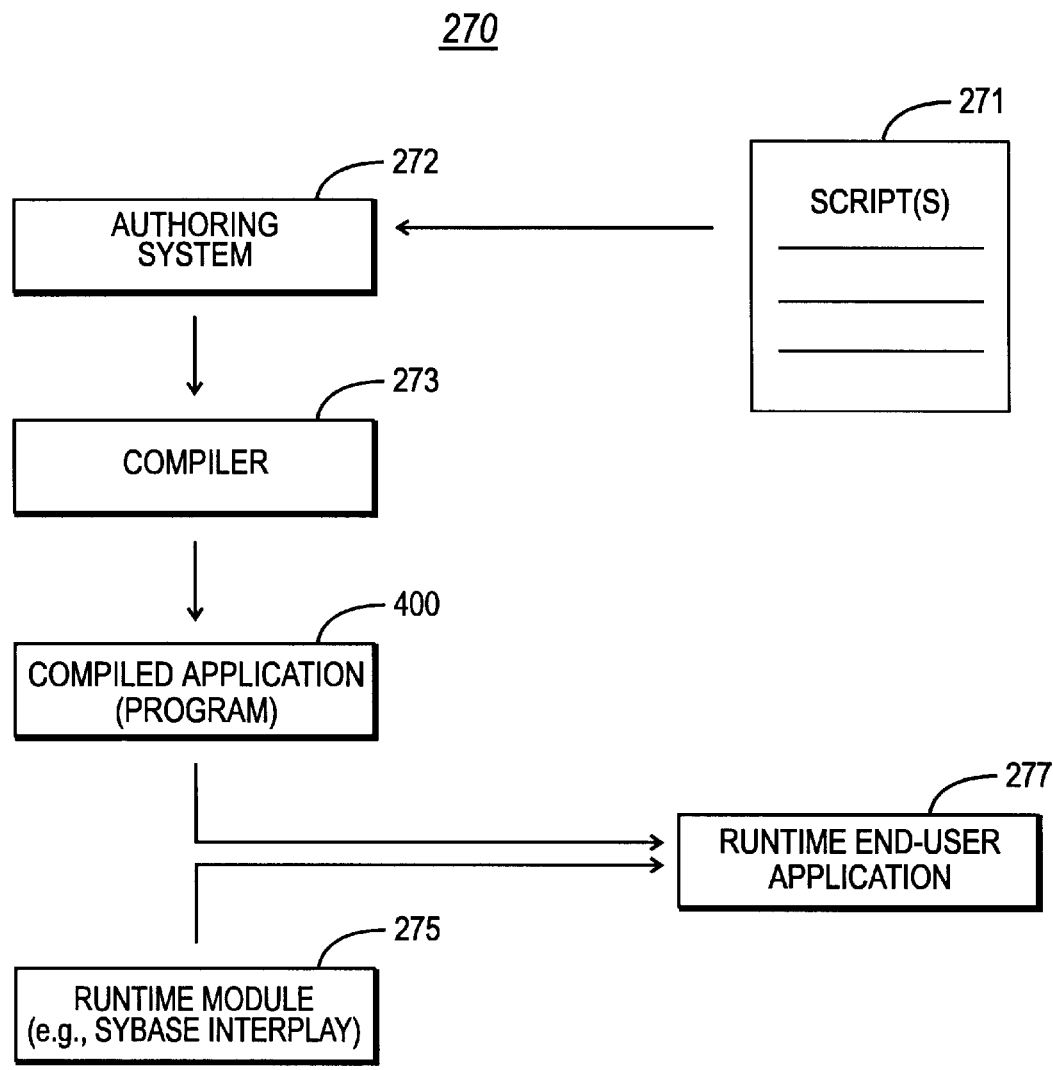

In parallel to the Interactive Television (ITV) Client/Server System, an additional system is employed for creating applications which reside on the server and run at the client. This second system 270, shown in FIG. 2C, is generally referred to as an "authoring" system. In a preferred embodiment, the system 270 comprises New Media Studio™, multimedia authoring system available from Sybase, Inc. of Emeryville, Calif.

During typical use of the system, a developer employs the authoring system 272 for creating a source code description or script 271 (i.e., New Media Studio™ Script) of the program under development. The script 271, in turn, is "compiled" by the compiler 273. Here, the compiler parses the information generated by the authoring system, for creating a compiled version of the program under development. As shown, the compiler 273 emits compiled application program 400. The application is then deployed, together with a runtime module 275, as a runtime application 277 at a target server. At runtime, a client loads the application from the server, whereupon it is executed at the client.

C. Client/server methodology for prefetching of semantic objects

1. Introduction

A "load set" represents a set of objects required to accomplish a particular computing task. In conventional systems, a working or load set is based entirely on physical considerations: cache sizes, disk sectors, memory pages, and the like. Instead of this hardware-centric view, the view adopted by the present invention is a developer's view on working set management—one which allows the creation of more efficient and dynamic programs. Each object itself, within a given load set, is a "semantic object." In other words, each object is a semantic or logical object, as opposed to a physical object (e.g., memory pages). This notion of a semantic object is maintained all the way to a particular client. Here, the individual developer is not forced to think in terms of disk sectors or memory pages. The developer can, instead, fashion the program under development to include a memory management scheme which comports with his or her view of the world.

Although some prior art systems include some notion of dependencies, none is well suited for multimedia data, namely images, videos, audios, and the like. The "packages" of Lisp systems encompassed the notion of dependencies, for instance. As such, they represent a more sophisticated approach than Dynamic Link Libraries (DLL), providing a better mechanism than DLLs for bringing dependent modules in for use and discarding those modules when no longer required. Nevertheless, once loaded, the "packages" behave like memory pages which were paged in or swapped out. Prior art approaches to an extent assume that the program code is very dynamic—that is, an almost limitless variety of execution paths. Programs which employ multimedia data, however, violates the assumptions (e.g., locality of reference) of usage patterns that traditional paging systems employ.

One of the biggest disadvantages of present-day systems is that the program itself is not given any reasonable control over the memory management process. For complex data, such as multimedia data, the program and the developer usually are in a better position to know what is going to happen next with the data. It is difficult for a physical-based memory management system, on the other hand, to discern the dependencies between objects. Consider, for instance, the need to render a 100K image using a 5K code fragment and a 50K code fragment. With present-day systems, there is simply no mechanism available whereby the system correctly discerns the interdependencies of these three objects.

2. Preferred storage methodology

Figure 3A:
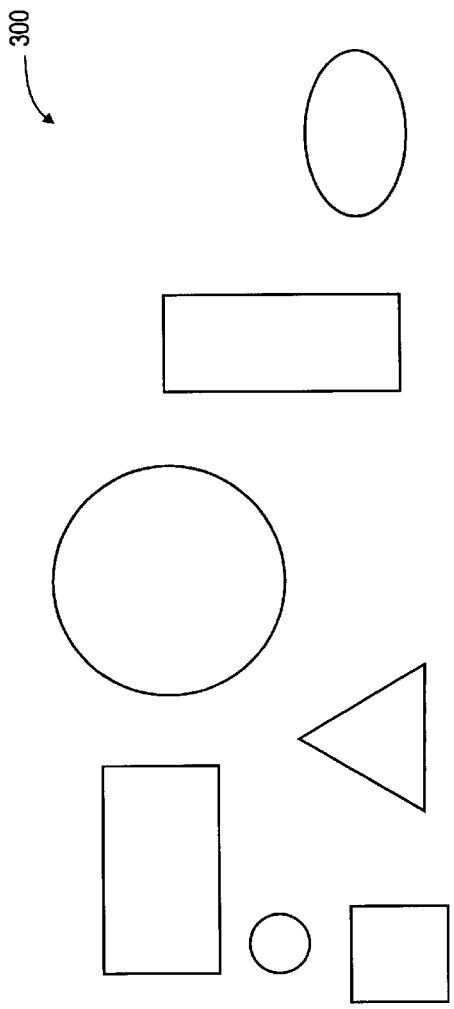
FIGS. 3A–B are diagrams illustrating a preferred approach of the present invention for storing objects.
Figure 3B:
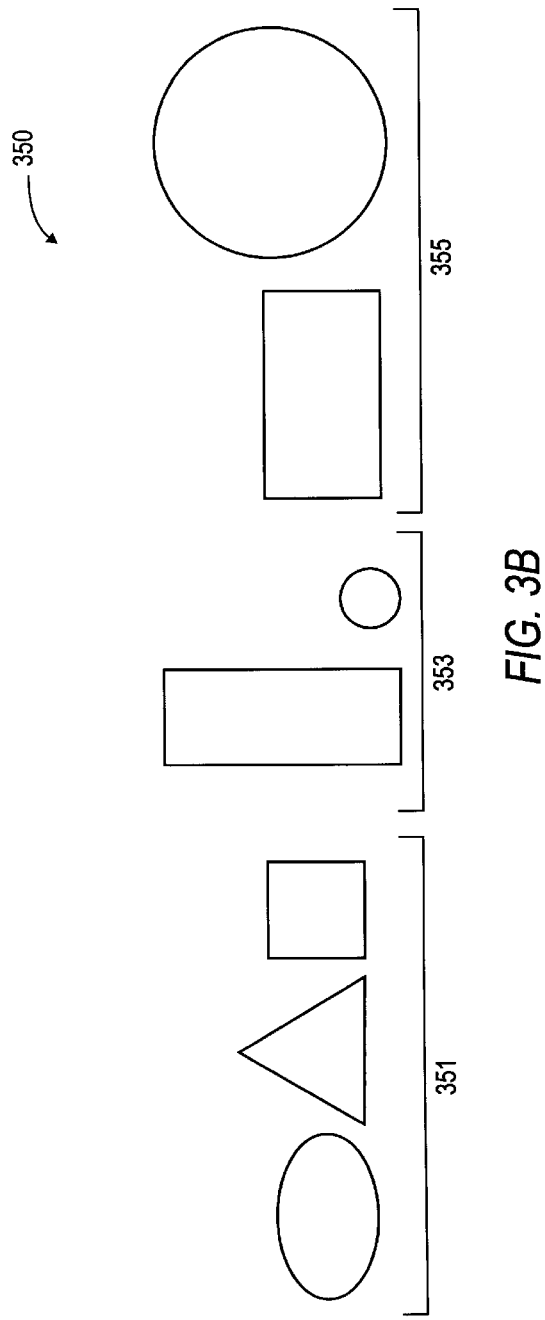

FIGS. 3A–B illustrate a preferred approach of the present invention for storing objects. Consider a program in the system, such as program 300, which comprises a plurality of "objects." In accordance with the present invention, objects, such as a program (shown at 350), can be viewed as being grouped or aggregated into "storables," such as storables 351, 353, 355 shown in FIG. 3B. Storable 351, for instance, might comprise a collection of text boxes, screen buttons, video multimedia data, and a video player, all represented as one storable.

Each storable itself comprises an object (or set of objects, such as combined code and data objects) stored together with dependency information—that is, information indicating which particular objects are also required for use of the (main) object. Each object itself may comprise one or more data entities and/or code entities (or a combination thereof), or other defined entity; there is no requirement that an object include or reference executable code (unlike, say, in object-oriented systems). Each program can be thought of as comprising a set of storables. An object may require that other objects be present in order for it to run. Since each such object is stored as a storable, dependencies can exist between storables. Apart from other storables which a particular storable is dependent on, there can exist storables which the particular object or storable "might" need. Whether this second class of storables is actually required at runtime execution is largely driven by end user action—how the end user interacts with the program.

When an end user operates the program, he or she executes various execution paths through the program. The user might operate the program in a manner anticipated by the developer. With the authoring system, the programmer creates an application which includes objects having a dependency list and (optionally) a prefetch list. The objects are stored on the server and, thus, can be manipulated by the server using conventional data manipulation technique. At runtime, a client request for a particular object typically leads to multiple objects being returned to the client. The actual objects returned are marked preferentially at the client for various discard strategies. Because every object is simply a generic object, from the perspective of the cache, the actual objects themselves (e.g., dependent objects and prefetch objects) can be varied dynamically so that the mechanism supports not only paging control but also content control of the application program, all within a single mechanism.

Figure 4A:
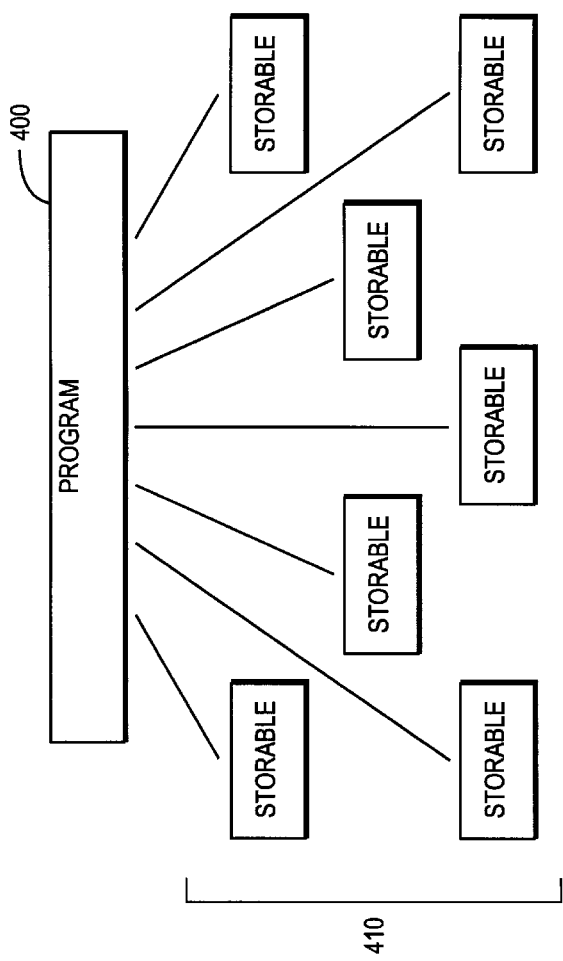
FIG. 4A is a diagram illustrating that, in accordance with the present invention, a program comprises a set of "storables."
Figure 4B:
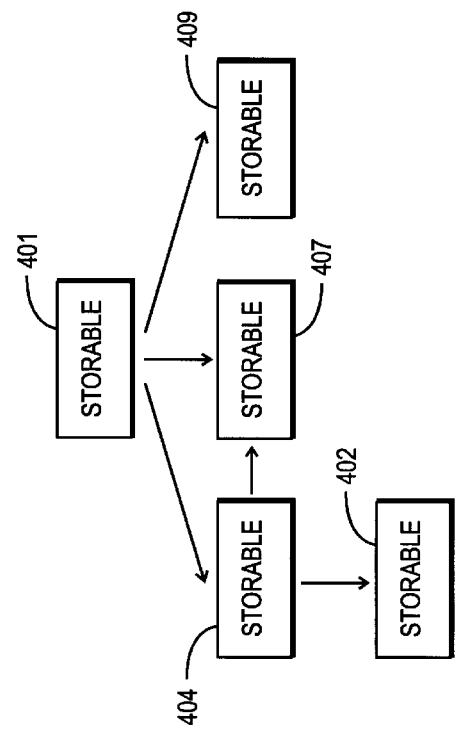
FIG. 4B is a diagram illustrating that a storable may in turn depends on other storables.

As part of its task of creating an application program, the compiler (273 of FIG. 2C) emits a set of storables for the program. As shown in FIG. 4A, for instance, the program 400 comprises a set 410 of storables. Further, the compiler 320 keeps track of what other storables each storable depends on. As shown in FIG. 4B, for instance, storable 401 depends directly on storables 404, 407, 409. Storable 404, in turn, depends on storables 402, 407. By automatically tracking dependencies between storables, the compiler 320 is able to group together related objects, even in instances where the programmer has provided no dependency information.

A collection of storables, therefore, is an application. The application itself is also a storable. For every storable contained within an application, the application knows what that storable's dependencies are. In this fashion, if an application is required to swap out a particular object or a particular page, the application itself can undertake steps to ensure that dependent objects are available for completing the task at hand. An application is, therefore, a special storable: it is a storable which also stores a dependency list of storables contained within itself.

The authoring system 272 supports script syntax providing a "prefetch" primitive or language construct. When the system encounters this primitive in a program script, the system collects, in a non-blocking manner, the storables specified programmatically and, in effect, puts them aside. In a preferred embodiment, this is done in a non-blocking manner, so that the application can continue execution while awaiting for this prefetch request to be completed.

In addition to providing scripts with a prefetch primitive, the system provides an alternative method for providing prefetching of storables. Specifically, the system includes tools which allow the developer to specify prefetching on the basis of end user interaction. In particular, the tools allow the developer to describe the program in terms of application "pages" or "scenes" which the user navigates. Each "page" characterizes a particular context of program execution, such as the user inputting data at a particular screen form. In typical operation, the developer inputs information describing page navigation sequences of the program. In exemplary use, for example, the tools may be employed to divide execution of a program into pages 1, 2, 3, 4, and 5. Here, the developer then also specifies that, for example, end user interaction with a program can cause execution to proceed from page 1 to page 2, then from page 2 to page 3, and then back to page 1. In this fashion, the tools allow the developer to impart his or her knowledge of end user usage and can incorporate this knowledge into an improved prefetching strategy.

The numbering of the pages (or other indicia, such as descriptive labels) does not necessarily dictate a particular order of execution. Instead, they impart a logical framework, which simplifies the programmer's task of indicating paths of execution. Thus, for instance, the programmer might specify that program execution proceeds from page 3 to page 1, followed by page 4. Therefore, although the programmer can specify an arbitrary sequence of navigation, he or she will typically provide those sequences which are advantageous for prefetching objects.

From the developer's input of page navigation, the tools generate the prefetching or dependency list for the application. With the tools, the programmer analyzes what user inputs are possible. Based on this information, the system can, in turn, decide which pages to list in its prefetch list.

3. Storable layout

Figure 5:
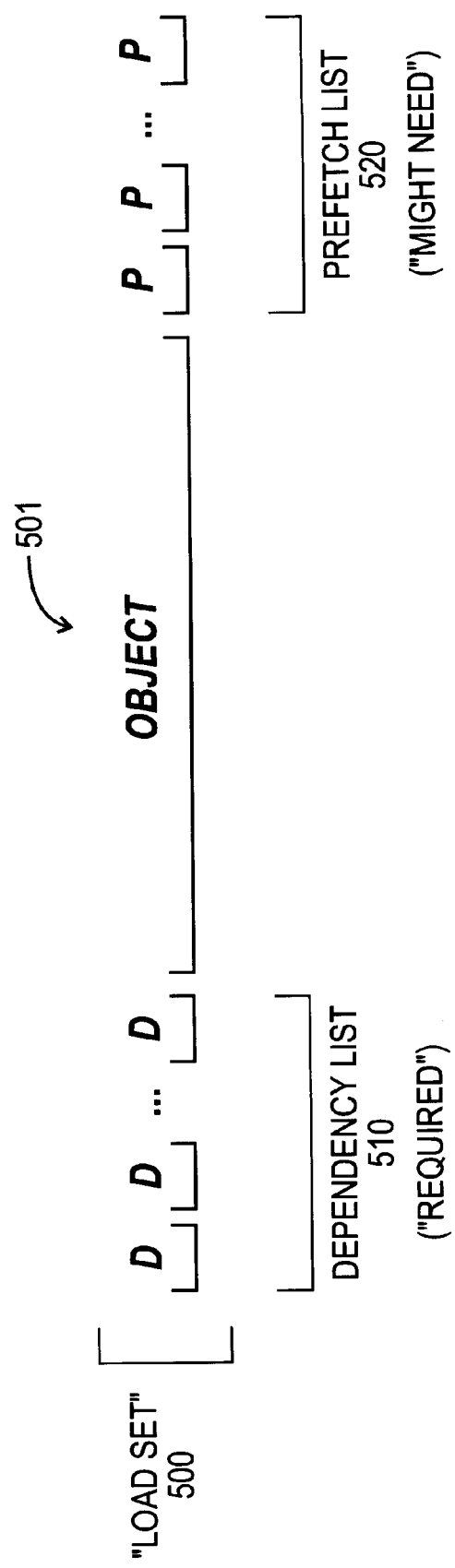
FIG. 5 is a diagram illustrating a preferred storage layout or "load set" for objects in the system.

FIG. 5 illustrates a preferred storage layout or "load set" 500 for objects in the system. Consider, for instance, object 501. Appended to the beginning of object 501 (i.e., before the actual data of the object) is a "required" dependency list 510—a list which specifies those objects required in order to use object 501. Appended to the other end of object 501 is a prefetch dependency list 520. This second list specifies those objects which "might" be required. Accordingly, the system knows for each object those objects which are required as well as those objects which might be needed.

The dependency list is automatically generated for each object by the system. The prefetch list or hints, on the other hand, reference those object indicated to the system (i.e., via Prefetch primitives) as being likely candidates for prefetching. The prefetch list appended to a particular object does not represent a static data structure. Instead, the list can be modified (e.g., either at compile time and/or dynamically at run time). Objects for which the prefetch list has been omitted may simply be treated as conventional objects, including using conventional paging schemes. By maintaining compatibility with those objects which have no prefetch list, the system allows any level of prefetch complexity to be added to an object, as desired.

In the system of the present invention, all storables are semantically the same. When a client requests a particular object, the client need not be concerned about whether particular objects returned are application objects, pages, prefetched objects, or the like. Instead, the client can simply treat them all the same, for purposes of caching.

4. Client/server prefetch dialog

Figure 6:
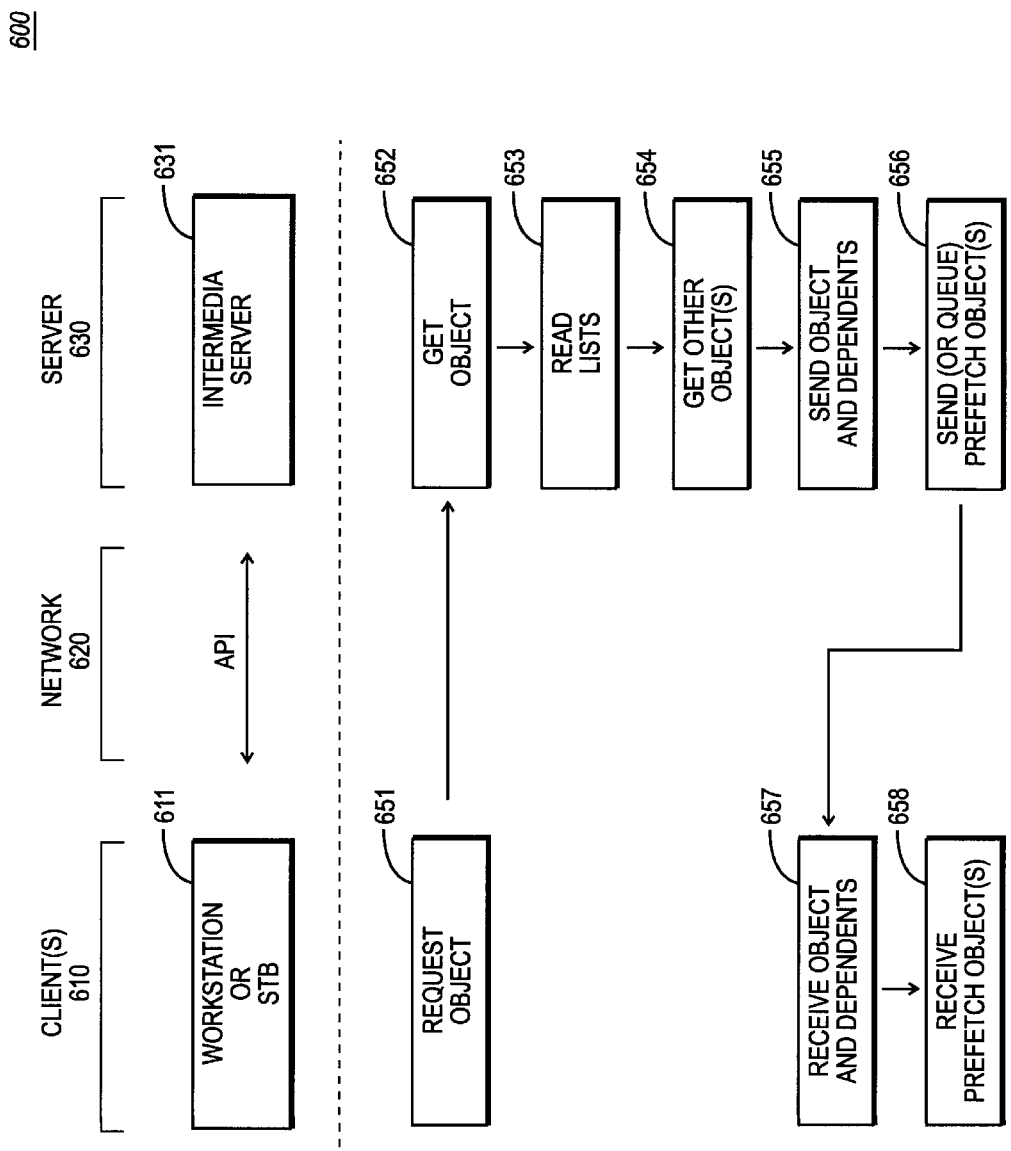
FIG. 6 is a block diagram of a client/server system performing prefetching, in accordance with the present invention.

FIG. 6 illustrates a client/server system 600 performing prefetching, in accordance with the present invention. For simplification, the block diagram of system 600 illustrates only those components of a preferred client/server system (e.g., ITV Client/Server System 200) necessary for carrying out a dialog. The system includes one or more clients 610 connected to a server 630 via a network 620. Each of the clients 610 comprises, for instance, a set top box (STB) or work station 611 (e.g., personal computer). The server 630, on the other hand, comprises a server 631 (e.g., Intermedia Server) modified to operate in accordance with the teachings of the present invention herein.

An exemplary dialogue between a client and the server occurs as follows. At 651, the client requests an object. Upon receipt of the request, the server retrieves the particular object from its own storage device, at 652. The server further processes the object as follows. At 653, the server reads the required and prefetch dependency lists of the object. At 654, the server retrieves any other objects specified by the requested object. At 655, the server transmits the requested object and any dependent objects back to the client. In addition, however, the server also sends (or queues up to be sent) any prefetch objects for the requested object, as shown at 656. The server will not send the prefetch objects during times when it is not advantageous to do so, such as during periods of heavy network traffic. At 657, the client receives the requested object and any dependent objects and, thus, can carry out the desired task. Additionally, at 658, the client receives any prefetch objects (during conditions when it is advantageous to do so).

This approach of the present invention may be applied to objects other than just those considered to be "traditional objects." Consider, for instance, a request to play a movie which also includes three trailers ahead of it (i.e., short film clips, such as advertisements, "coming attractions," or the like). The client will request the movie. If that movie's dependency list includes the name of three trailers in front of it, the client will receive the three trailers followed by the movie.

5. Changing application behavior by changing object context

Since these objects are being provided by a database server, the dependency objects themselves can be changed without changing the underlying logic of the application program itself. A powerful approach emerges. Without changing the application itself, simple changes to the dependent objects employed can change how the application looks and how it performs, using simple database manipulation technique (i.e., to point to other objects).

Consider a request by a client to display a particular page. By simple manipulation of the dependency list for the page object, the server can send before the page object a season-specific (i.e., spring, summer, fall, or winter) bit map for rendering on the page. The actual bit map rendered on the page at runtime, therefore, changes with the changing season. Since the dependent objects are, unlike DLL, kept in a database, it is a straightforward task to change the various objects without modifying the underlying application. Program logic for actually changing which objects are employed can reside in stored procedures which are stored at the server, independent of the application. All told, the approach provides benefits not only for the memory management of objects but also provides a simple mechanism to vary dynamically the content of a program.

Internal operation

A. Division of responsibility for prefetching

Dependency prefetching managment for a given load set—that is, management of "required" dependents, the object itself (or set of objects), or "prefetch" dependents—can occur at the client, at the server, or at a combination of the two. Actual implementation of management responsibility will depend, to a large extent, on the capabilities of a given client relative to its server, and the capabilities of the network which connects the client to the server.

For ITV applications, prefetching intelligence is generally implemented at the server side. Here, clients tend to be "dumb," such as economically-produced set top boxes. A "dumb" client can simply instruct the server to send everything. The server, in turn, assumes responsibility for how and when required dependents, the object itself, and all prefetch dependents are sent. In a "dumb" client implementation, therefore, each request requires the server to perform all the work.

For Internet applications, in contrast, prefetching intelligence is shifted to the client side. Here, clients tend to be "smart" clients—expensive work stations or PCs. Servers, on the other hand, tend to be "dumb," simply providing content upon request. A smart client can, for instance, initially only request the object and then undertake the task of later fetching the required dependents and prefetch dependents. Alternatively, the client can initially request required dependents and the object from the server. After unpacking the original object, the client manages the task of how and when to prefetch other objects.

Actual prefetching of objects typically occurs in the background, for instance, when sufficient client-side memory is available. Recall, however, that the behavior of the client can be modified at runtime by using the prefetching primitives provided by the script language. In this fashion, the developer can dynamically override the default behavior of the client, if desired. The various combinations possible are illustrated by diagram 700, shown in FIG. 7. The client can undertake all or part of the responsibility for managing fetching for the object, its required dependents, its prefetch dependents, or any combination thereof. Generally, responsibility not undertaken by the client can be assumed by the server.

B. Smart clients with client-side caches

As an alternative to requesting some combination of an object and its dependents, the present invention allows a client to instead request just the "names" of an object and its dependencies. A smart client which maintains a client-side cache can first check received names against its own cache for first determining whether the objects sought are already present at the client (that is, check before an actual fetch request is made to the server). The requesting of names can be performed according to the division of labor set forth in FIG. 7. For instance, the client can request the object and its required dependents but only the "names" of the prefetch dependents, as shown in diagram 800 FIG. 8, particularly at (b). In those instances where the client determines that the objects are not in its local cache, the client can then proceed to request that the objects be fetched from the server.

C. Low memory at the client

Under circumstances of low memory at the client, the following action is undertaken. Objects are thrown out of memory if they are not related to the current task at hand (e.g., screen being viewed by the end user). Since the system maintains a dependency list, it knows to not discard those objects which are required dependent objects (currently required). Typically, the system begins discarding those objects which have been prefetched but which are not actually yet required. Traditional caching mechanisms, in contrast, have no such mechanism and, accordingly, exhibit the common problem of discarding objects which are in fact required. For instance, a traditional caching mechanism has no facility for tracking which data structures are referenced by particular code objects. Since such mechanisms or schemes employ unsophisticated least-recently used (LRU) methodology, needed objects are often accidentally discarded from memory.

The swapping out of objects (including completely discarding objects), like the prefetching of objects, occurs on a semantic (as opposed to physical) basis. In particular, objects are swapped out, not on a physical page level, but on a per object basis. Objects which a user is currently viewing on screen and their required dependents are maintained in memory. Additionally, objects can also be programmatically "pinned" or "locked" in memory using a "lock in core" primitive of the system. Objects which are "locked" are treated as if they are currently being viewed: they must remain in memory. Objects which are typically locked or pinned would include system code which is perhaps never viewed but often executed. These objects are preferably locked, so as to not complicate the dependency list. In other words, rather than adding such objects to the dependency list of most if not all other objects, these "system objects" are simply locked in memory. When an object need not be kept in memory, it can be "unlocked." Here, the lock is released; the object itself is not necessarily discarded from memory (unless "release," described below, is used). In this manner, the developer can tune the system (including reducing network traffic) in advance, based on information known to the application.

Finally, the client can swap out prefetched objects using conventional LRU (least-recently used) technique, so that the system preferentially discards those prefetch objects which have been least-recently used. For example, certain objects might have been prefetched based on information from the dependency lists, yet use of these objects at runtime does not materialize. These "older" prefetched objects can be "aged" out (i.e., swapped out). In this manner, the determination of prefetched objects or items which are preferentially kept is driven by actual program behavior. Here, if a user actually uses a prefetched object, that object is promoted—that is, one which is unpacked in to an object specifying required dependents and prefetch dependents.

Figure 9:
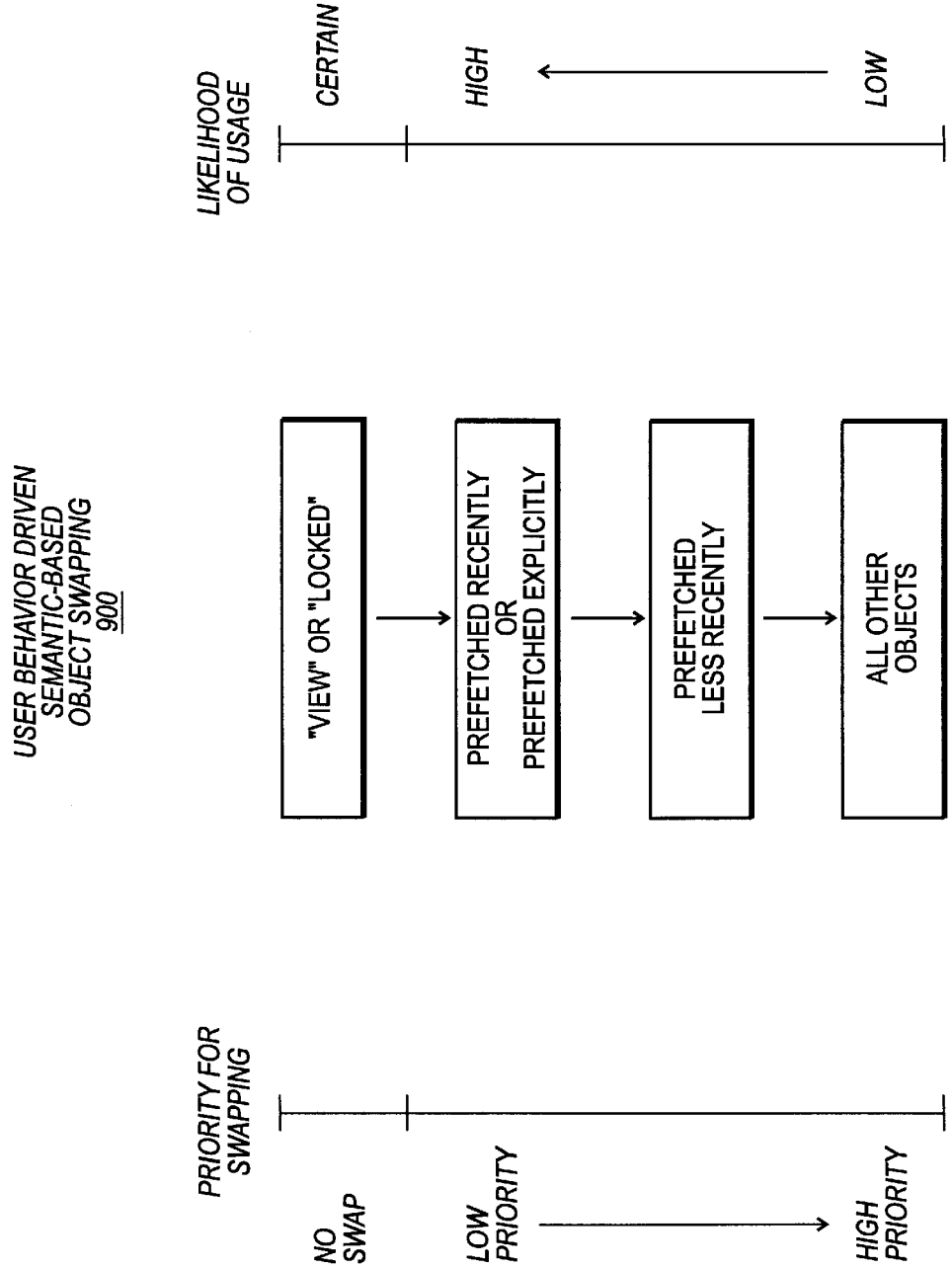
FIG. 9 illustrates a user-behavior driven, semantic-based approach to object swapping/discarding.

FIG. 9 illustrates a user-behavior driven, semantic-based approach to object swapping. As shown, the system 900 has a bias towards objects which are "ahead" as opposed to objects which are "behind." If an object has been prefetched recently or explicitly, the system can imply such prefetching as an indicator of where the user is likely to go next, in his or her operation of the application. In a multimedia application, for instance, user interaction typically proceeds in an antegrade fashion, instead of a retrograde fashion. The swapping mechanism employed, since it is based on semantic objects, can as a result be more closely tied to user behavior. All told, the system of the present invention applies a bias to swapping which favors those objects which are ahead of the user, rather than those objects which are behind the user.

For all other objects which are neither viewed/locked or prefetched, the system simply applies LRU methodology. Here, these other objects can be swapped out based on how recently each was used. The system is tunable for either very smart clients or very smart servers, and anything in between. Further, prefetching and lock-in-core primitives are provided which allow the developer to exercise additional control over how the semantic cache operates. This provides an effective caching mechanism for a wide range of environments.

D. Prefetching methods

1. Smart client environment (e.g., Internet)

Figure 10:
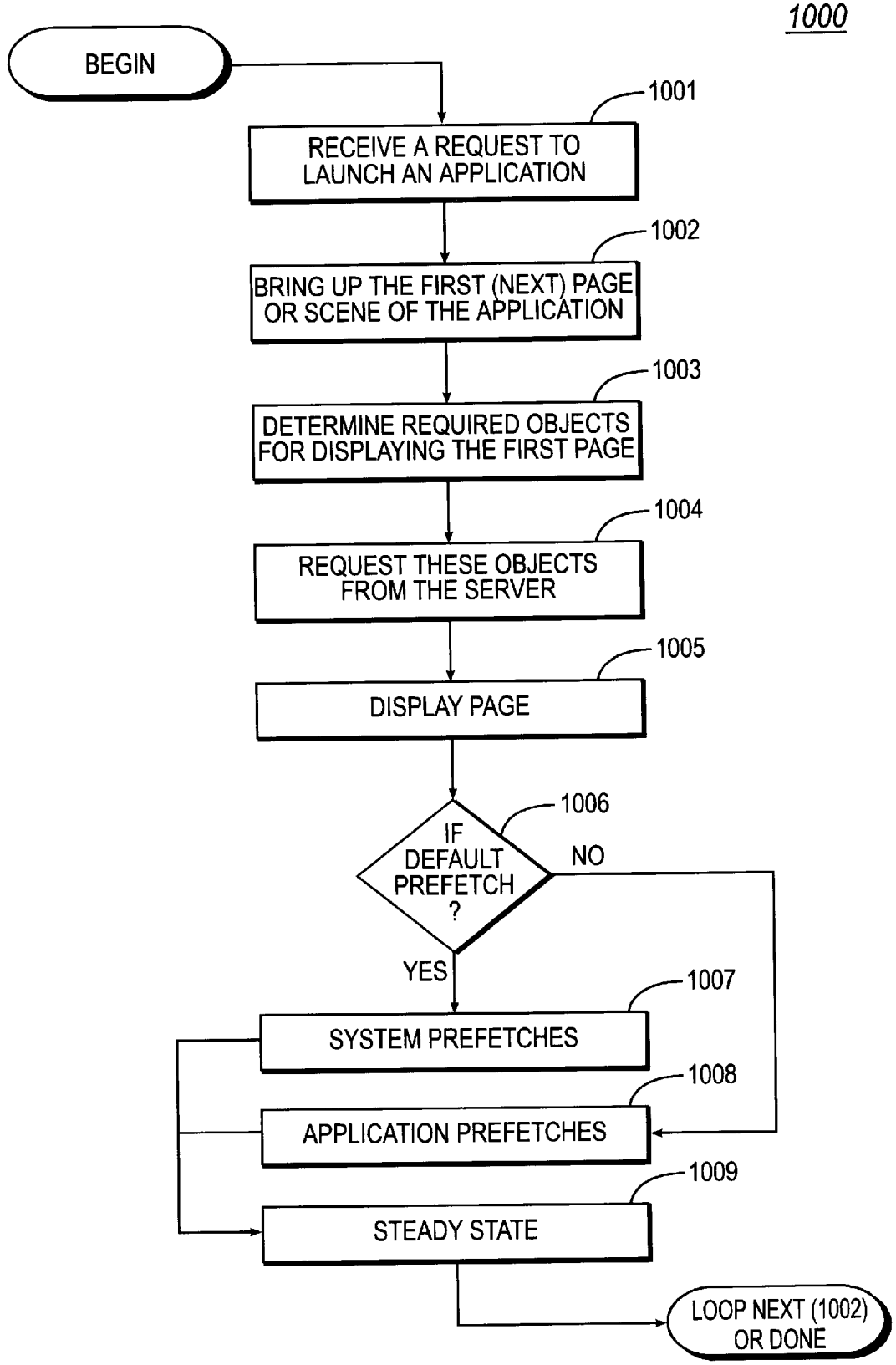
FIG. 10 is a flowchart illustrating an exemplary method of the present invention for executing applications with prefetching of semantic objects.

Referring now to FIG. 10, an exemplary method 1000 for executing applications with prefetching of semantic objects will now be described. At step 1001, the client/server system receives a request to launch an application. In the Internet environment, for example, the user can click on a hyperlink at the client for launching an interactive application. In a preferred embodiment, the interactive application is run using Interplay™ runtime module (available from Sybase, Inc. of Emeryville, Calif.). At step 1002, an application object (which may include a runtime engine) arrives from the server. Its initial task is to bring up the first page or scene of the application. From the dependency list for the first page, the client can determine required objects for displaying the first page, as shown at 1003. At step 1004, the client requests these objects from the server. Once these objects are available at the client, the first page can actually be rendered or displayed, as shown at step 1005.

The prefetch objects for the first page can now be retrieved. This can be done either by the system by default (yes at step 1006), or it can be done in response to commands of the application itself. For the former, the system performs prefetching at step 1007. For the latter, the system performs prefetching in response to prefetch requests from the application, at step 1008. For the system-default prefetching, the system determines objects to prefetch based on the previously coded relationships between pages. For application or user-directed prefetching, the system performs prefetching based on programmatic requests present in the scripts, which operate in response to user behavior at runtime. Thus, for system-default prefetching, the objects prefetched are based on the navigational exits from the page. For a complex page with many exits, however, better results are generally achieved by directing prefetching based on user input at the page.

Next, the application enters a steady state, as indicated by step 1009. If memory resources run low as a result of operation, the system can discard objects in the manner previously described (in FIG. 9). At the same time, the application can mandate that certain objects remain "locked" in core memory, such as a top-level menu which the user often returns to. In the event that too many objects have been locked in memory, the system will send a notification to the application that insufficient memory is available. The system continues in this steady state, at step 1009, until a request is received to go to a next page (or the application terminates).

Upon receipt of a request to go to a next page, the system undertakes steps similar to that previously described for the first page. Note, however, that objects exist in the client's local cache. Therefore, the client will first check its cache before fetching required objects or prefetching other objects. In a preferred embodiment, a multi-level caching scheme is maintained at the client. A first level cache stores objects in random-access memory (RAM) of the client. In addition to this, the client can cache objects in its local storage device (e.g., hard disk). Although caching from the local storage device is far slower than caching to random-access memory, it is substantially faster than retrieving the object across a network. When prefetch items are tossed out of memory, for instance, they can be swapped to local disk. In a preferred embodiment, prefetched objects are not "unpacked" until they are actually required for use. Here, these objects are not unpacked into their ultimate target forms in memory (e.g., executable code module). Instead, they are simply maintained locally until such time as they might be required. When required, however, the objects are unpacked on-the-fly into their preferred client-side form, such as a code object which may be executed upon unpacking.

Complementing the "locking" primitive is a "release" primitive—a mechanism to explicitly release or remove objects from memory. Just as the system can discern, based on user action, that certain objects are likely to be required, the system can also determine that certain objects are unlikely to be required. The release primitive, therefore, gives the application developer a language construct for explicitly removing from memory such objects. In this fashion, the application can prefetch ahead and "prune" behind.

2. Dumb client environment (e.g., ITV)

In the ITV environment, several restrictions come into play. Although ITV networks are typically high bandwidth, they are also exhibit high latency. As a result, it is better for one request to return several items or objects. Accordingly, in an ITV environment, the "smart" server plays a larger role in deciding when to send objects. In particular, when a server receives a request for a particular object, it in turn sends the object together with the dependencies. In contrast to the approach adopted at step 1004, here, responsibility for fetching of dependents is performed by the server. In essence, the server "batches" together requests for objects, based on dependency lists. Prefetch objects, on the other hand, are not automatically sent, since clients in such environments (e.g., set top boxes) tend to have a relatively small amount of local memory available. In an exemplary ITV embodiment, therefore, prefetching requests are generally initiated by the clients.

Although the server in such an environment does not send unsolicited prefetch objects (i.e., ones which clients have not requested), it can nevertheless "prime" any subsystems necessary for transmitting the prefetch objects. The server, for instance, can itself prefetch into its own main memory (i.e., server memory) those objects indicated to be prefetch objects. Further, these objects can be moved into an accompanying network buffer, so that they are ready to send to the client upon request.

While the invention is described in some detail with specific reference to a single preferred embodiment and certain alternatives, there is no intent to limit the invention to that particular embodiment or those specific alternatives. Thus, the true scope of the present invention is not limited to any one of the foregoing exemplary embodiments but is instead defined by the appended claims.

What is claimed is:

1. In a system comprising a client connected to a server through a network, a method for sending objects from the server to the client, the method comprising:

receiving a request from a client for a particular object of interest, in response to user input received at an application executing at said client;

determining at runtime dependent objects for the particular object, said dependent objects comprising those objects which are required for use of the particular object by the client;

determining prefetch objects for the particular object, said prefetch objects comprising those objects which are likely to be used by the client upon use of the particular object and which are determined, based at least in part, on an object-based prefetch primitive present in said application, which operates in response to said user input occurring at runtime;

sending to the client said particular object requested and said determined dependent objects; and selectively sending to the client said determined prefetch objects.

2. The method of claim 1, wherein said particular object comprises an object which is viewed on screen by a user, and wherein said dependent objects comprise those objects which must be present at the client in order to display the particular object on screen.

3. The method of claim 2, wherein said particular object comprises a page of an interactive application program and wherein said dependent objects comprise individual objects displayed on said page.

4. The method of claim 1, wherein said particular object requested is stored on the server as a storable, said storable including a list of dependent objects and a list of prefetch objects for said particular object.

5. The method of claim 4, wherein said selectively sending step includes:
determining at the client from the list of prefetch objects which prefetch objects to request from the server.

6. The method of claim 5, wherein said determining which prefetch objects to request step includes:
monitoring user input at the client for determining which prefetch objects are most likely to be required.

7. The method of claim 5, wherein said determining which prefetch objects to request step includes:
monitoring memory available at the client for storing additional objects.

8. The method of claim 1, wherein said prefetch objects which are sent to the client remain packaged in a form in which said prefetch objects were originally sent to the client.

9. The method of claim 8, wherein at least some of said prefetch objects comprise code objects and wherein said method further comprises:
unpacking prefetch objects into a form in which said prefetch objects are directly executable by the client.

10. The method of claim 8, wherein at least some of said prefetch objects comprise code objects and wherein said method further comprises:
maintaining said prefetch objects in a package form in which said prefetch objects cannot be directly executable by the client.

11. The method of claim 1, wherein said prefetch objects which are sent to the client are swapped out to a non-volatile storage device on the client when the client experiences low memory conditions.

12. The method of claim 1, wherein said request for a particular object of interest comprises a request from a user to launch an interactive application.

13. The method of claim 1, wherein said particular object comprises an executable application and wherein said method further comprises:
receiving a command from the application to expressly prefetch certain objects stored on the server.

14. The method of claim 1, wherein said particular object comprises an executable application and wherein said method further comprises:
receiving a command from the application for explicitly removing certain objects from client memory.

15. The method of claim 1, further comprising:
experiencing a low memory condition at the client; and
freeing up memory at the client by discarding from client memory least-recently used prefetch objects.

16. The method of claim 15, wherein objects which are discarded from client memory are swapped to disk storage of the client.

17. The method of claim 1, wherein said determining prefetch objects step occurs at the client after the particular object has been sent to the client.

18. In a system comprising a client connected to a server, a method for object-based caching of objects on the client, the method comprising:
establishing at the client a hierarchy of objects to preferentially keep in memory, said objects being received from the server, in response to user input received at an application executing at said client;
experiencing a low memory condition at the client; and
in response to said low memory condition and based at least in part on an object-based prefetch primitive present in said application that operates in response to said user input occurring at runtime, performing a selected one of:
if an object is not likely to be used at the client, discarding the object from memory,
if an object is likely to be used at the client, swapping the object out to a mass storage device local to the client, and
if an object is certain to be used at the client, maintaining the object in memory at the client.

19. The method of claim 18, wherein said hierarchy comprises objects which are required, objects which might be required, and objects which are not known to be required.

20. The method of claim 19, wherein said objects which are required comprise only those objects necessary for rendering a current view on screen to a user.

21. The method of claim 20, further comprising:
providing page-level physical memory management in addition to said object-based caching.

22. The method of claim 20, wherein said server has a high latency, such that said client can access objects swapped to said mass storage device faster than the client can receive the objects from the server.

23. An interactive television system comprising:
a television device having a set top box connected to a host, in response to user input received at an application executing at said client;
means for requesting that a particular object be sent from the host to the set top box, said particular object including a list of dependent objects and a list of prefetch objects, said dependent objects comprising those objects required for use of said particular object, said prefetch objects comprising objects likely to be required upon use of the particular object;
means for sending said particular object from the host to the set top box, said means sending dependent objects together with the requested particular objects; and
means for selectively sending said prefetch objects from said host to said set top box, said means operating based at least in part on an object-based prefetch primitive present in said application that operates in response to said user input occurring at runtime.

24. The method of claim 23, wherein said particular object comprises a storable, said storable maintaining a list of dependent objects in a list of prefetch objects for the particular object.

25. The method of claim 23, wherein said means for selectively sending said prefetch objects includes:
means responsive to user input for determining which ones of said prefetch objects should be sent to the set top box.

26. The method of claim 23, wherein said means for selectively sending said prefetch objects includes:
means for monitoring how a user navigates among objects and determining based on said user navigation which objects should be prefetched for the set top box.

27. The system of claim 23, wherein objects present in the system comprise program code objects, data objects, and mixed program code/data objects.

28. In a system comprising a client connected to a server through a network, a method for sending objects from the server to the client, the method comprising:

receiving a request from a client for a particular object of interest, in response to user input received at an application executing at said client;

determining related objects for the particular object based at least in part on an object-based prefetch primitive present in said application that operates in response to said user input occurring at runtime, said related objects comprising those objects which are required or which may be required upon use of the particular object by the client;

sending to the client a name identifying said particular object requested and names identifying said determined related objects;

determining, based on said names, which objects currently reside at the client; and selectively sending from the server to the client of those objects determined to not reside at the client.

\* \* \* \* \*